May 5, 1953    R. L. McCREARY    2,637,820
CURRENT INTEGRATOR

Filed March 3, 1950    2 SHEETS—SHEET 1

INVENTOR.
RALPH L. McCREARY
BY Marvin Moody
ATTORNEY

May 5, 1953 R. L. McCREARY 2,637,820
CURRENT INTEGRATOR
Filed March 3, 1950 2 SHEETS—SHEET 2

INVENTOR.
RALPH L. McCREARY
BY Marvin Moody
ATTORNEY

Patented May 5, 1953

2,637,820

UNITED STATES PATENT OFFICE 2,637,820

CURRENT INTEGRATOR

Ralph L. McCreary, Cedar Rapids, Iowa, assignor to Collins Radio Company, Cedar Rapids, Iowa, a corporation of Iowa Application March 3, 1950, Serial No. 147,408

4 Claims. (Cl. 250—83.3)

This invention relates in general to current recording apparatus, and in particular to apparatus for measuring currents of very low magnitude.

It is sometimes necessary to measure a very small current. For example, the ion gun of a cyclotron has a very small current and it is quite difficult to accurately measure it. The conventional ammeter is not usable because of the small current.

It is an object of this invention, therefore, to provide apparatus which will accurately record currents of very low magnitude.

Another object of this invention is to provide apparatus which will measure the flow of charged particles very accurately.

Yet another object is to provide apparatus for measuring the flow of either negatively or positively charged particles.

A further object of this invention is to integrate a fluctuating current to measure the amount of charge.

A feature of this invention is found in the provision for a collector which intercepts charged particles and furnishes their charge to a condenser, thus biasing a non-conducting tube to the conducting state. As the tube commences to conduct, plate current passes through an inductive coil which induces voltage in the grid circuit with a polarity such that the grid becomes more positive. As the grid becomes more and more positive, part of the electron flow from the cathode will flow to the grid instead of the plate, until finally the plate current is zero. As the plate current falls to zero, the inductive effect will tend to drive the grid far negative. This cycle is repeated as more charge is supplied to the condenser and a pulse counter inductively-coupled to the plate coil records the repetitive rate of the cycles. This rate is directly proportional to the average current at the collector electrode. The instrument may be used to integrate a current of ranging magnitude to obtain the average rate of charge movement.

Further objects, features, and advantages of this invention will become apparent from the following description and claims when read in view of the drawings, in which:

Figure 1:
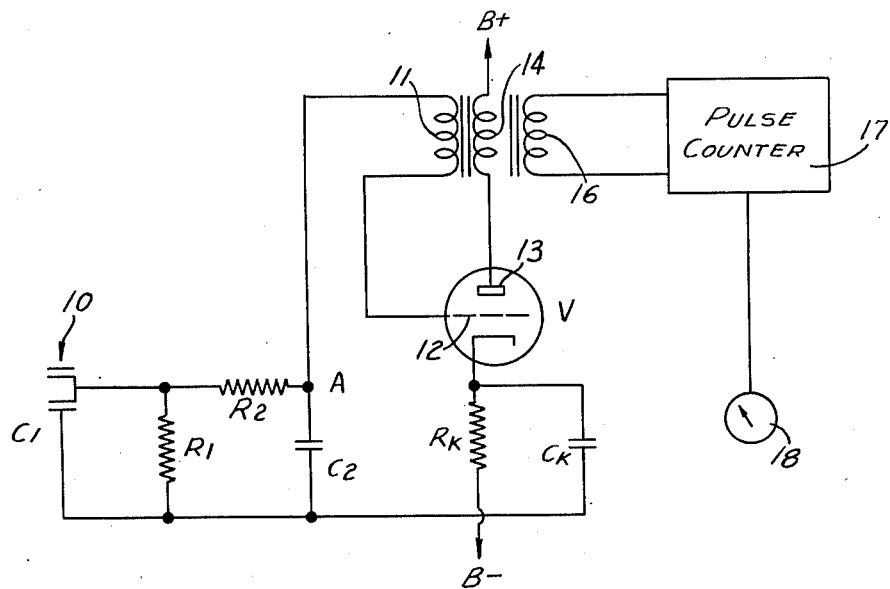
Figure 1 is a wiring diagram of the apparatus of the invention wherein positive charge is collected on a collector electrode.

Referring to Figure 1, assume that it is desired to record the flow of positively charged particles. A collector, designated as 10, is placed in the path of the charged particles so that they impinge thereon. As the particles impinge on the collector 10, they give up their charge to the collector and cause current to flow through the resistance $R_1$ and $R_2$. The resistance $R_1$ is relatively large and the current through $R_2$ will, therefore, be appreciably greater than that through $R_1$. As the positive charges are collected on the collector 10, point A becomes more positive. If a triode tube V is initially in the non-conducting state, it will commence to conduct when the point A goes above the cutoff potential. This is true because the point A is connected through the inductive coil 11 to the grid 12. As conduction starts the plate current flows from the plate 13 through a coil 14, connected in series therewith. The coils 11 and 14 are inductively coupled together in such a manner that an increasing current passing through the coil 14 will induce a voltage in coil 11 with a polarity such that it drives the grid 12 more positive. As the grid 12 becomes more positive, more plate current flows and the grid begins to draw current. The increasing plate current continues to drive the grid even more positive, until finally the grid draws enough current to cause the plate current to decline. When this condition occurs, the voltage induced in the coil 11 will be in the opposite polarity to the voltage induced when the plate current was increasing, and thus the grid 12 will be driven negative as the plate current falls to zero. When the grid current flows, it passes through the capacitance $C_2$ due to the relatively high frequency components of the grid current.

When the grid of the tube has been driven past cutoff, the point A is at a negative potential and remains there until the positively charged particles impinging on the collector 10 build it up to a potential high enough to cause conduction to start once again in the tube V. This cycle is repeated again and again and the number of cycles is directly proportional to the charge collected at the collector 10.

Inductively coupled to the coil 14 is a third coil 16 which is connected to a pulse counter 17. A meter 18 indicates the number of pulses. Thus the number of cycles occurring gives an indication of the total positive charge collected.

The invention allows beams of positively charged particles such as protons, deuterons, alpha particles, or positive ions to be integrated. The collector has a capacitance to ground of $C_1$. The values of $R_1$ and $C_1$ are chosen so that their product, $R_1C_1$ is very much greater than the longest integrated time. The values of $R_2$ and $C_2$ are selected so that $(R_1+R_2)C_2$ is much greater than the longest integrated time ($t_{max}$). The bias voltage is so chosen for the tube V that when the grid is at ground potential, the plate current is reduced to a small steady value.

The cathode condenser $C_k$ and the cathode resistor $R_k$ must be chosen so that $R_kC_k$ is much less than $t_{min}$, where $t_{min}$ is the shortest integrated time. Tube V and the coils 14 and 11 with the inductive coupling are commonly described as a blocking oscillator which is known to those skilled in the art. For more detailed description of the theory of operation of such a device, reference may be had to the publication, Radiation Laboratory Series, volume 19, chapter 6, pages 205 to 253.

Figure 2:
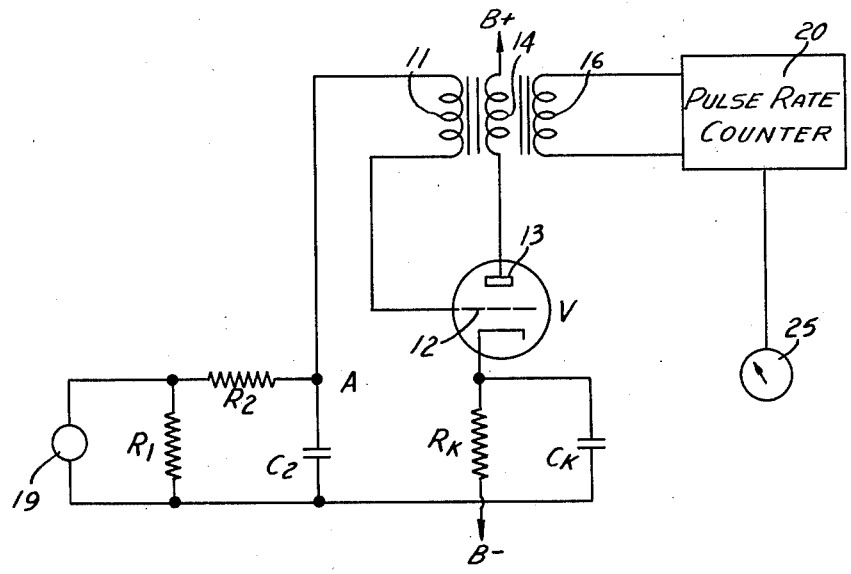
Figure 2 is a modification of the invention illustrated in Figure 1 wherein the collector electrode has been replaced by any unknown current source; and, Figure 3 is a wiring diagram of a charge flow meter for recording the flow of negatively charged particles.

Figure 2 is similar in all respects to Figure 1 except that the collector 10 has been replaced by any current source 19 which it is desired to measure. The current source must be connected so that the positive side will be connected to point A. The operation of the counter is the same as the one illustrated in Figure 1. In this case the current source 19 replaces the capacitance $C_1$ because it is analogous to a large capacitance. The pulse counter 17 of Figure 1 is replaced by a pulse rate counter 20 and the reading of meter 25 is directly proportional to the current flow of the unknown source 19.

Figure 3:
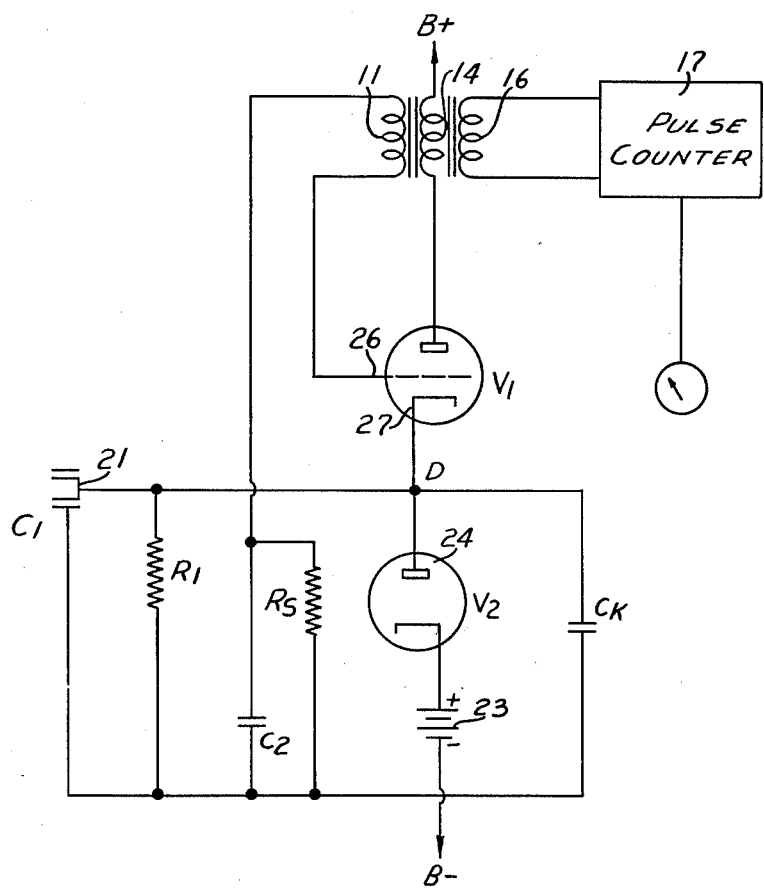

Figure 3 illustrates a circuit for integrating negatively charged particles such as negatively charged ions or electrons. A collector 21 collects the negatively charged particles. A tube $V_1$ is initially non-conducting because its grid 26 is at ground potential due to the grid-leak resistor $R_s$. The cathode 27 will initially be at a positive potential with respect to the grid because of the biasing voltage from the battery 23. A diode rectifier 24 is connected in series with the grid 26 and the cathode 27. As the collector 21 collects a negative charge, the point D is driven less positive until the cathode is at a low enough potential to cause conduction to start in the tube $V_1$. The tube $V_2$ starts to conduct when tube $V_1$ does, and the $V_1$ plate current is obtained therethrough. When conduction starts, the inductive coil 14 causes a voltage to be induced in the grid coil 11, thus driving the grid 26 more positive in a manner similar to that of Figure 1. This causes the plate current of tube $V_1$ to increase and causes the grid 26 to take more and more of the cathode emission until the plate current commences to decrease. The decrease in plate current tends to drive the grid negative and the tube is again driven to cutoff. The grid current flows through the capacitance $C_2$ during this transient condition, until the grid is once again at ground potential. For operation of this circuit to occur, $R_sC_2$ must be relatively small and $R_1C_k$ must be relatively large. If the backward resistance of the diode $V_2$ is designated as $R_B$ then the condition that $$C_k \frac{R_1 R_B}{R_1 + R_B} \gg t_{max}$$

must be satisfied, where $t_{max}$ is the maximum time to be integrated. Once again a pulse counter is inductively coupled to the coil 14 to indicate the number of cycles. The number of cycles is proportional to the number of negatively charged particles collected.

It is seen that this invention provides means for very accurately measuring very low level currents, and is particularly valuable in recording the ion current for a cyclotron, for example.

Although particular embodiments have been shown and described, the invention is not to be so limited to the particular arrangement of capacitances and resistances, because any arrangement which gives the equivalent circuit is within the broad scope of this invention, as defined by the appended claims.

I claim:
1. Means for measuring the rate of flow of positively charged particles comprising a collector-electrode having a virtual capacitance to ground with one plate of said collector-electrode connected in series with a pair of parallel resistors, and with the opposite end of one resistor connected to the control grid of a blocking oscillator and to a condenser, and with the time constant of the second resistor and the virtual capacitance being much greater than the maximum integrated time, and a pulse rate counter coupled to said blocking oscillator plate circuit.

2. A current integrator comprising an unknown current source with the positive polarity of said current source connected to a pair of resistors, and with the negative side of said current source connected to the opposite end of one of the resistors, a condenser connected between the opposite end of the one resistor and the opposite end of the other resistor, the opposite end of the other resistor connected to the control grid of a blocking oscillator, an inductive means coupled to the plate circuit of said blocking oscillator, and pulse counter means connected to said inductive means.

3. An integrator for measuring low values of current comprising a collector-electrode for collecting negatively charged particles, said electrode connected to the cathode of a blocking oscillator, a diode tube $V_2$ connected to the cathode of the blocking oscillator with the plate of the diode connected to the cathode of the blocking oscillator, a positive biasing voltage connected to the cathode of said diode, and a capacitance and resistance connected in parallel with the control grid of said blocking oscillator and to the high voltage side of the collector-electrode, an inductive means coupled to the plate circuit of the blocking oscillator, and means for indicating the number of blocking oscillator cycles.

4. A system according to claim 1 wherein the pulse rate counter is replaced by a pulse counter to integrate the current received at the collector-electrode.

RALPH L. McCREARY.

References Cited in the file of this patent

UNITED STATES PATENTS

| Number | Name | Date |
|---|---|---|
| 2,340,967 | Langer | Feb. 8, 1944 |
| 2,411,573 | Holst et al. | Nov. 26, 1946 |
| 2,415,567 | Schoenfeld | Feb. 11, 1947 |
| 2,452,563 | Glover | Nov. 2, 1948 |
| 2,486,021 | Gross | Oct. 25, 1949 |
| 2,490,642 | Lipson | Dec. 6, 1949 |
| 2,500,473 | Spaeth | Mar. 14, 1950 |
| 2,500,581 | Seeley | Mar. 14, 1950 |